United States Patent
Green et al.

(10) Patent No.: US 11,340,110 B2
(45) Date of Patent: May 24, 2022

(54) SYSTEM AND METHOD FOR ASSESSING SPECTROSCOPIC SENSOR ACCURACY

(71) Applicant: INTERNATIONAL BUSINESS MACHINES CORPORATION, Armonk, NY (US)

(72) Inventors: William Green, Yorktown Heights, NY (US); Eric Zhang, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 931 days.

(21) Appl. No.: 16/123,859

(22) Filed: Sep. 6, 2018

(65) Prior Publication Data

US 2020/0080891 A1 Mar. 12, 2020

(51) Int. Cl.
  *G01J 3/45* (2006.01)
  *G01J 3/02* (2006.01)
  *G01N 21/27* (2006.01)

(52) U.S. Cl.
  CPC ............... *G01J 3/027* (2013.01); *G01J 3/021* (2013.01); *G01J 3/45* (2013.01); *G01N 21/274* (2013.01)

(58) Field of Classification Search
  CPC ...... G01J 2003/2879; G01J 3/027; G01J 3/45; G01N 21/274
  See application file for complete search history.

(56) References Cited

U.S. PATENT DOCUMENTS 6,807,205 B1 * 10/2004 Albrecht ................. H01S 3/225
  372/20
2017/0146448 A1 * 5/2017 Green .................. G01N 21/274

OTHER PUBLICATIONS

Chu C. Teng, "Dynamic Optical Fringe Suppression for Silicon Photonic Sensors" May 18, 2018 (Year: 2018).*
P. Werle, "Accuracy and precision of laser spectrometers for trace gas sensing in the presence of optical fringes and atmospheric turbulence," Appl. Phys. B 102 (2), pp. 313, 2011.
J. B. McManus, p. L. Kebabian, M. S. Zahniser, "Astigmatic mirror multipass absorption cells for long-path-length spectroscopy," Appl. Opt. 34 (8), pp. 3336, 1895.
P. Werle, B. Scheumann, J. Schandl, "Real-time signal-processing concepts far trace-gas analysis by diode-laser spectroscopy," Opt. Engin. 33 (9), pp. 3093, 1994.
J. A. Silver, A. C. Stanton, "Optical interference fringe reduction in laser absorption experiments," Appl. Opt. 27 (10), p. 1914, 1988.
B. Lins, P. Zinn, R. Engelbrecht, B. Schmauss, "Simulation-based comparison of noise effects in wavelength modulation spectroscopy and direct absorption TDLAS," Appl. Phys. B 100 (2), p. 367, 2010.

(Continued)

*Primary Examiner* — Maurice C Smith
(74) *Attorney, Agent, or Firm* — F. Chau & Associates, LLC (57) ABSTRACT

A method for assessing spectroscopic sensor accuracy, includes building an a priori simulation of generalized etalon drift. A spectroscopic sensor is tested to determine use parameters. A specific drift model is generated by applying the determined use parameters to the built a priori simulation of generalized etalon drift. The specific drift model is analyzed to determine whether the spectroscopic sensor is satisfactory.

20 Claims, 6 Drawing Sheets

(56) References Cited

OTHER PUBLICATIONS

G. Tu, F. Dong, Y. Wang, B. Culshaw, Z. Zhang, T. Pang, H. Xia, B. Wu, "Analysis of random noise and long-term drift for tunable diode laser absorption spectroscopy system at atmospheric pressure," IEEE Sensors J. 15 (6), p. 3535, 2015.

G. Somesfalean, M. Sjoholm, L. Persson. H. Gao, T. Svensson, S. Svanberg, "Temporal correlation scheme for spectroscopic gas analysis using multimode diode lasers," Appl. Phys. Lett. 86, p. 184102, 2005.

C. J. Smith, W. Wang, G. Wysocki, "Real-time calibration of laser absorption spectrometer using spectral correlation performed with an in-line gas cell," Opt. Exp. 21 (19), p. 22488, 2013.

E. J. Zhang, B. E. Brumfield, and G. Wysocki, "Hybrid Faraday rotation spectrometer for sub-ppm detection of atmospheric O2" Opt. Exp. 22 (13), 15957-15958, (2014).

W. M. J. Green, C. Xiong, E. J. Zhang, L. Tombez, Y. Martin, J, Chang, T. Barwicz, M. Khater, G. Wysocki, H. Hamann, "Silicon photonics for on-chip trace-gas spectroscopy," 3rd ACM International Conference on Nanoscale Computing and Communication, (Invited Talk) New York, Sep. 2016.

E. J. Zhang L. Tombez, J. S. Orcutt, S. Kamlapurkar, G. Wysocki, W. M. J. Green, "Silicon photonic on-chip trace-gas spectroscopy of methane," Conference on Lasers and Electro-Optics SF2H.1, San Jose 2016.

G. Kim, H. Lea, C. Park, S. Lee, B. T. Lim, H. K. Bae, W. Lee, "Silicon photonic temperature sensor employing a ring resonator manufactured using a standard CMOS process," Opt. Exp 18 (21), p. 22215, 2010.

J. Komma, C. Schwarz, G. Hofmann, D. Heinert, R. Nawrodt, "Thermo-optic coefficient of silicon at 1550 nm and cryogenic temperature," Appl. Phys. Lett. 101, p. 041905, 2012.

C. Dyroff, "Tunable diode-laser absorption spectroscopy for trace-gas measurements with high sensitivity and low-drift," Karlsruhe Series in Photonics & Communications 5, 2008.

J. Hodgkinson, R. P. Tatam, "Optical gas sensing: a review," Meas. Sci. Technol. 24 (1), p. 012004, 2013.

* cited by examiner

SYSTEM AND METHOD FOR ASSESSING SPECTROSCOPIC SENSOR ACCURACY

GOVERNMENT LICENSE RIGHTS

This invention was made with government support under DE-AR0000540 awarded by the Department of Energy. The government has certain rights in the invention.

BACKGROUND

The present invention relates to spectroscopic sensors and, more specifically, to systems and methods for assessing spectroscopic sensor accuracy.

Spectroscopic sensors may be used as part of laser absorption spectroscopy (LAS) techniques to determine the atomic and/or molecular composition of matter by analyzing the frequency spectrum of laser light passing through an analyte. One common type of LAS is tunable diode laser spectroscopy (TDLAS) and recently, on-chip spectroscopic sensors for performing TDLAS have been developed.

However, spectroscopic sensors such as on-chip TDLAS sensors may be prone to reflections of light from unwanted interfaces that may lead to various standing wave interference patterns, which may lead to inaccurate analyte quantification as the observed signal may appear to include spectral baseline fluctuations. This effect may be known as optical fringing, or Fabry-Perot etalons, as it is caused by the light circulating within an unintended optical cavity of the spectroscopic sensor. In particular, recent developments utilizing silicon photonic waveguides within the on-chip spectroscopic sensors may be particularly prone to optical fringes with difficult to predict time-dependent variations particularly due to ambient temperature fluctuations, owing to the relatively large thermo-optic coefficient of silicon.

Some optical fringes may be readily removable (e.g. those that are static and/or unvarying) from the observed signal, other optical fringes may be difficult to isolate and remove, as in the case of multiple fringes with different time-dependent behaviors. Whether the optical fringes are easily removed or difficult to remove therefore depend on the nature of the optical fringes, which may depend on the individual characteristics of the on-chip spectroscopic sensor. In particular, the spectral baseline fluctuations due to optical fringing is unique for each spectroscopic sensor, even those constructed on an identical platform due to the stochastic nature of unintended scattering points along the optical path.

Given the presence of temporal drift of the optical fringes, the accuracy of concentration retrieval deviates over time, requiring periodic sensor recalibration. Typically, the analyte concentration retrieval is performed via least-mean squares (LMS) regression modeling to the retrieved optical spectrum, using such models including, but not limited to Voigt, Lorentz, Gaussian, Martian, or Galatry spectral profiles. The lineshape parameters for generating such profiles are well documented in literature and may be either modeled theoretically or determined empirically. Based on the results of the LMS regression model, the analyte concentration is retrieved as a time-series, which may be performed in either real-time or post-processing analytics as required by the user-operator.

A key specification of the LAS sensor involves: (1) the minimum detection limit, denoted hereafter as MDL, i.e. the smallest quantity of analyte that may be detected such that the signal-to-noise ratio is unity, and (2) sensor stability time, denoted hereafter as $\tau_{stab}$, which is the duration of time over which the LAS sensor is limited by Gaussian noise, white noise, or any noise with a uniform power spectral distribution. Within a measurement time (also termed "integration time") of $\tau_{stab}$, the LAS sensor exhibits random-noise performance such that averaging up to $\tau_{stab}$ provides improvement in sensitivity according to the square-root of averaging time. Also within this time frame below $\tau_{stab}$, the sensor is considered to be "precise" and not in need of recalibration. Beyond the stability time $\tau_{stab}$ however, the sensor drift yields concentration retrieval artefacts, whereupon the spectroscopic. LAS sensor may be deemed to be "inaccurate" and thus needs to be "recalibrated" once the drift surpasses a maximum tolerable limit defined by the user-operator.

The standard method to determine the spectroscopic sensor MDL and stability time $\tau_{stab}$ is through Allan-deviation analysis of the aforementioned retrieved concentration time-series (based on the LMS regression models described above), which provides a measure of the sensitivity of the spectroscopic sensor as a function of measurement (i.e. "integration") time. Conventional Allan-deviation analysis however, requires the long-term measurement (and corresponding concentration retrieval) for each sensor unit, and is not easily generalizable to field conditions, which may exhibit or cause unpredictable thermal and/or mechanical deviations in the spectroscopic sensor, resulting in MDL and $\tau_{stab}$ different from results obtained in a laboratory setting.

SUMMARY

A method for assessing spectroscopic sensor accuracy, includes building an a priori simulation of generalized etalon drift. A spectroscopic sensor is tested to determine use parameters. A specific drift model is generated by applying the determined use parameters to the built a priori simulation of generalized etalon drift. The specific drift model is analyzed to determine whether the spectroscopic sensor is satisfactory.

A computer program product for assessing spectroscopic sensor accuracy includes a computer readable storage medium having program instructions embodied therewith. The program instructions are executable by a computer to cause the computer to build, by the computer, an a priori simulation of generalized etalon drift, test a spectroscopic sensor, by the computer, to determine use parameters, generate a specific drift model, by the computer, by applying the determined use parameters to the built a priori simulation of generalized etalon drift, and analyze the specific drift model, by the computer, to determine whether the spectroscopic sensor is satisfactory.

A system for assessing spectroscopic sensor accuracy includes a simulator configured to build an a priori simulation of generalized etalon drift. A spectroscopic sensor is configured to run a test to determine use parameters. A modeler is configured to generate a specific drift model by applying the determined use parameters to the built a priori simulation of generalized etalon drift. An analyzer is configured to analyze the specific drift model to determine whether the spectroscopic sensor is satisfactory. The simulator, the modeler, and the analyzer may be implemented as one or more computer processors executing instructions for performing the tasks for which they are configured.

BRIEF DESCRIPTION OF THE SEVERAL VIEWS OF THE DRAWINGS

A more complete appreciation of the present invention and many of the attendant aspects thereof will be readily obtained as the same becomes better understood by reference to the following detailed description when considered in connection with the accompanying drawings, wherein.

DETAILED DESCRIPTION

In describing exemplary embodiments of the present invention illustrated in the drawings, specific terminology is employed for sake of clarity. However, the present invention is not intended to be limited to the illustrations or any specific terminology, and it is to be understood that each element includes all equivalents.

This present disclosure addresses the limitations of conventional sensitivity analysis by introducing a generalized accuracy assessment method that is implementable based on a spectral decomposition of each etalon contribution of a specific sensor unit, yielding stability analysis results applicable to both laboratory and field conditions with no additional required testing. The basic premise involves the determination of relative etalon contributions to the spectrometer accuracy, which may be used to determine the corresponding sensor stability time once environmental conditions have been specified by an end-user or operator. The method disclosed herein does not require sensor characterization under well-controlled laboratory environments, and the use of a single spectral scan (as opposed to long-term spectral measurements in conventional sensitivity analysis) will accelerate the testing of each sensor up to $10^3\times$, providing a scalable test platform implementale in the large-scale manufacturing of spectroscopic sensors.

Exemplary embodiments of the present invention relate to a system and method for assessing a quality of a spectroscopic sensor, such as an on-chip spectroscopic sensor, to readily determine whether a given spectroscopic sensor is subject to optical fringing of a nature that renders its performance (i.e. accuracy, stability time) below an acceptable standard desired by the user for a given target application. Such an acceptable standard may be defined as an absolute sensitivity level (i.e. minimum detection limit), or alternatively as a stability time (i.e. duration over which the spectroscopic sensor is limited by Gaussian-noise). Such spectroscopic sensors not satisfying the user requirements may be rejected during manufacturing so that only those spectroscopic sensors that have optical fringing within a tolerable level may be utilized and/or integrated into commercial devices while those spectroscopic sensors that exhibit overly severe fringing may be discarded or put to alternative uses.

The suitability of a spectroscopic sensor may be determined from the sensitivity and stability of the spectroscopic sensor, as those spectroscopic sensors that are sufficiently sensitive and sufficiently stable may be most effective. However, it may be difficult to obtain meaningful ratings for sensitivity and stability of spectroscopic sensors, given the multitude of environmental conditions under which they operate, which in turn affect the sensitivity metrics that may be quoted from a laboratory test diagnostic.

The tolerable severity of fringing may be expressed by the minimum detection limit and/or stability time achievable by a given spectroscopic sensor. In a conventional sense, this may be determined by direct Allan-deviation analysis of multiple sequential spectra acquired over a long duration (typically $10^3$ s or more). Such a direct analysis includes the impact of all fringes present in the spectrum and the associated fringe drifts under the particular test conditions. However, this conventional diagnostic is not generalizable under varying environmental conditions; for example, under particularly strenuous external conditions where mechanical vibrations and/or thermal fluctuations cause severe fringe drifts, the aforementioned minimum detection limits and stability time will not he applicable, and a re-analysis of the sensor stability must be performed under the new conditions indeed, every new sensor deployment condition will need to undergo separate rounds of testing, which is entirely unfeasible for sensor diagnostics during large-scale manufacturing processes.

For example, one approach for determining sensitivity and stability of spectroscopic sensors involves observing the spectroscopic sensor in use across a large time and a range of temperatures so that sufficient data may be collected to characterize optical fringing across time and temperature. This may require the use of long-term operation and precise thermal controls and must be repeated for each sensor unit, Allan-deviation analysis will then be performed on the data that has been collected for each spectroscopic sensor so as to obtain a measure of sensitivity and stability. This method is extremely time-consuming and data intensive, while requiring an experienced attendant performing the diagnostics.

The method disclosed herein provides an approach for ascertaining the minimum detection limits and stability time of spectroscopic sensors under varying environmental conditions. The method requires only a single spectral scan to determine the individual etalon contributions, while the end-user may provide the tolerable detection limits and stability times under expected deployment conditions, which will be used to gauge the suitability of each spectroscopic sensor for use under deployment conditions. The method disclosed herein makes use of a generalized simulation system, built upon a customized etalon drift platform, which needs only be performed once and is generalizable to all absorption-based spectroscopic sensors exhibiting any number of optical fringes.

Exemplary embodiments of the present invention may utilize an approach for spectroscopic sensor analysis that is based on a customized etalon drift platform. By using this generalized model, a few key parameters may be quickly and easily observed for the spectroscopic sensor and these parameters may be entered into the generalized model to return sensitivity and stability values, without having to acquire data over a long period of time, over a long temperature range, and without having to perform Allan-deviation analysis. Examples of such parameters include, but are not limited to (1) short-term sensitivity, denoted by $\sigma_0$ and (2) effective temperature drift rate, denoted by $T_R$. The former (1) is empirically derived from conventional sensitivity analysis for short-time intervals (<1 s), and does not require any sensor stabilization, as short-term precision is dominated by the optical intensity noise and/or detection system noise. The latter (2) is provided by the end-user, which specified the expected temperature drift (for example, in mK/s) that may be anticipated during the conditions of sensor deployments. Whereas conventional stability diagnostics utilize of Allan-deviation analysis under a given set of diagnostic conditions (i.e. $T_R$ is specific to the diagnostic conditions), our generalized etalon drift platform provides normalized sensitivity and stability time results that may be applied to any scenario with known temperature drift rate $T_R$.

Figure 1:
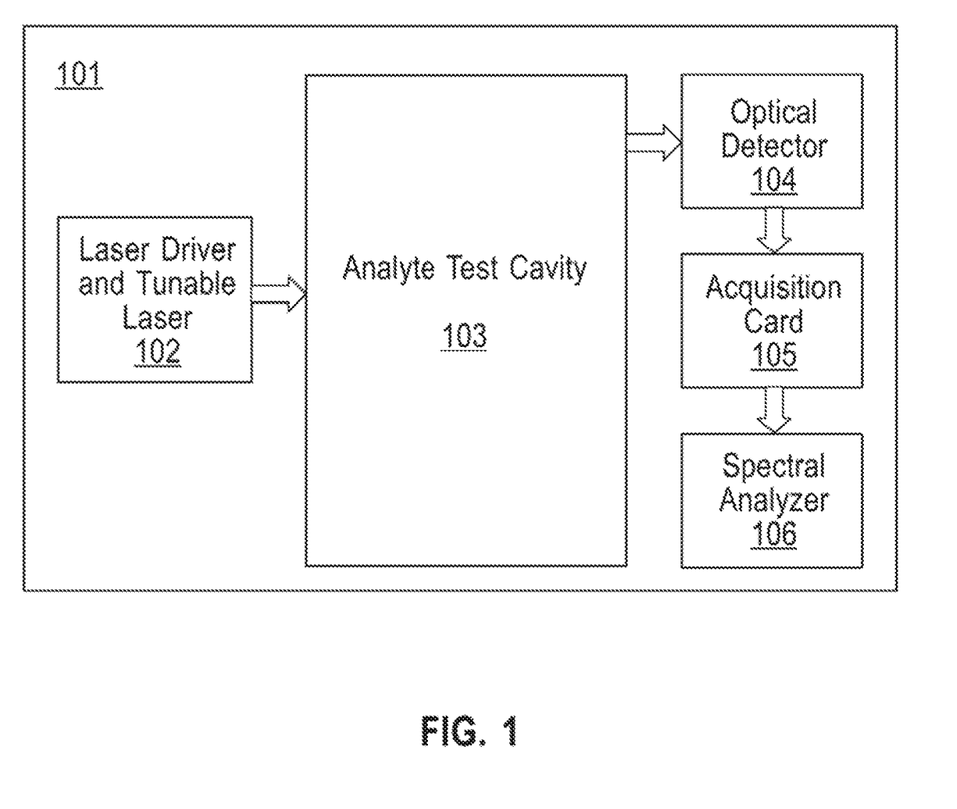
FIG. 1 is a schematic diagram illustrating a laser absorption spectroscopy (LAS) sensor in accordance with exemplary embodiments of the present invention.

FIG. 1 is a schematic diagram illustrating a laser absorption spectroscopy (LAS) sensor in accordance with exemplary embodiments of the present invention. While a simplified schematic is provided, it is to be understood that the LAS sensor may be embodied as either a free-space (or open-path) system, or as an integrated on-chip silicon LAS apparatus, as a pigtailed waveguide sensor coupled to an external laser source and detector, or any other suitable LAS sensor. The LAS sensor arrangement 101 may include a laser driver and a tunable laser source driven therewith 102. The laser driver may be configured to drive the laser source across a desired frequency spectrum. The laser light generated from the laser driver and a tunable laser source driven therewith 102 may be directed to an analyte test cavity 103, which may be an exposed region in which ambient gas is permitted to enter and interact with the optical path.

In the analyte test cavity 103, the laser light may collide with gas molecules thereby exciting the gas molecules, which may then resonantly interact with photons of a particular wavelength once the optical wavelength is in the vicinity of a transition resonance. As the wavelength of the photons absorbed may be characteristic for the gas within the analyte test cavity 103, an optical detector 104 may be used to sense the light throughput from the analyte test cavity 104 in the vicinity of the resonant wavelength and an acquisition card 105 may be used to sample the optical detector 104 output for digitization and spectral analysis. A spectral analyzer 106 may then be used to identify the nature of the gas within the analyte test cavity 103 based upon the spectra observed. Typically, infrared sources (encompassing near- and mid-infrared wavelengths) are utilized for detection of the rotational-vibrational transitions of common molecules, a small subset of which includes (hut is not limited to): water vapor, carbon dioxide, ozone, nitrous oxide, carbon monoxide and methane. Furthermore, electronic transitions are targetable in the ultraviolet wavelengths, and it is notable that our generalized etalon drift platform is applicable to all wavelengths and therefore transition types of interest for LAS.

It is to be understood that various optical waveguides and other optical elements are included within the LAS sensor arrangement, for example, to guide light from the laser source to the analyte test cavity, to guide light from the analyte test cavity to the optical detector, etc.

In practice, the above described detection approach is frequently complicated by the presence of background noise, such as the undesirable optical fringe patterns that are formed as light is reflected back and forth along the various optical waveguides and other optical elements. These fringe patterns may, at times, be difficult to isolate from the spectra resulting from the optical absorption resonances of the gas molecules, particularly as the optical characteristics of each particular LAS sensor arrangement provide unique fringe patterns. Moreover, the fringe patterns may have a tendency to change with ambient temperature, and various other ambient conditions.

Each individual LAS sensor arrangement may be tested to characterize the background noise that is associated with the individual sensor. However, this characterization may be quite involved. For example, as discussed above, the testing might need to be performed over a long period of time to see how the background noise changes over time. Also, the testing might need to be performed over a range of temperatures as fringe patterns may be particularly sensitive to temperature. Moreover, in order to assess the quality of the background noise, the observed fringe patterns may have to be modeled, and this process might be computationally expensive. Additionally, the testing might need to be performed by a highly skilled operator, thereby resulting in testing that is time consuming, resource consuming, and expensive.

Exemplary embodiments of the present invention utilize a system and method that can more quickly and efficiently characterize etalons and other noise factors for a given LAS sensor arrangement by utilizing a predetermined generalized (i.e. parameter normalized) drift simulation that can be quickly and easily adapted to the particular LAS sensor arrangement, thereby reducing the time needed, the expertise needed, and the computational resources required to determine the suitability of the LAS sensor arrangement for a given application demanding a tolerable minimum detection limit and stability time for the detection of a given analyte, or combination of analytes.

Figure 2:
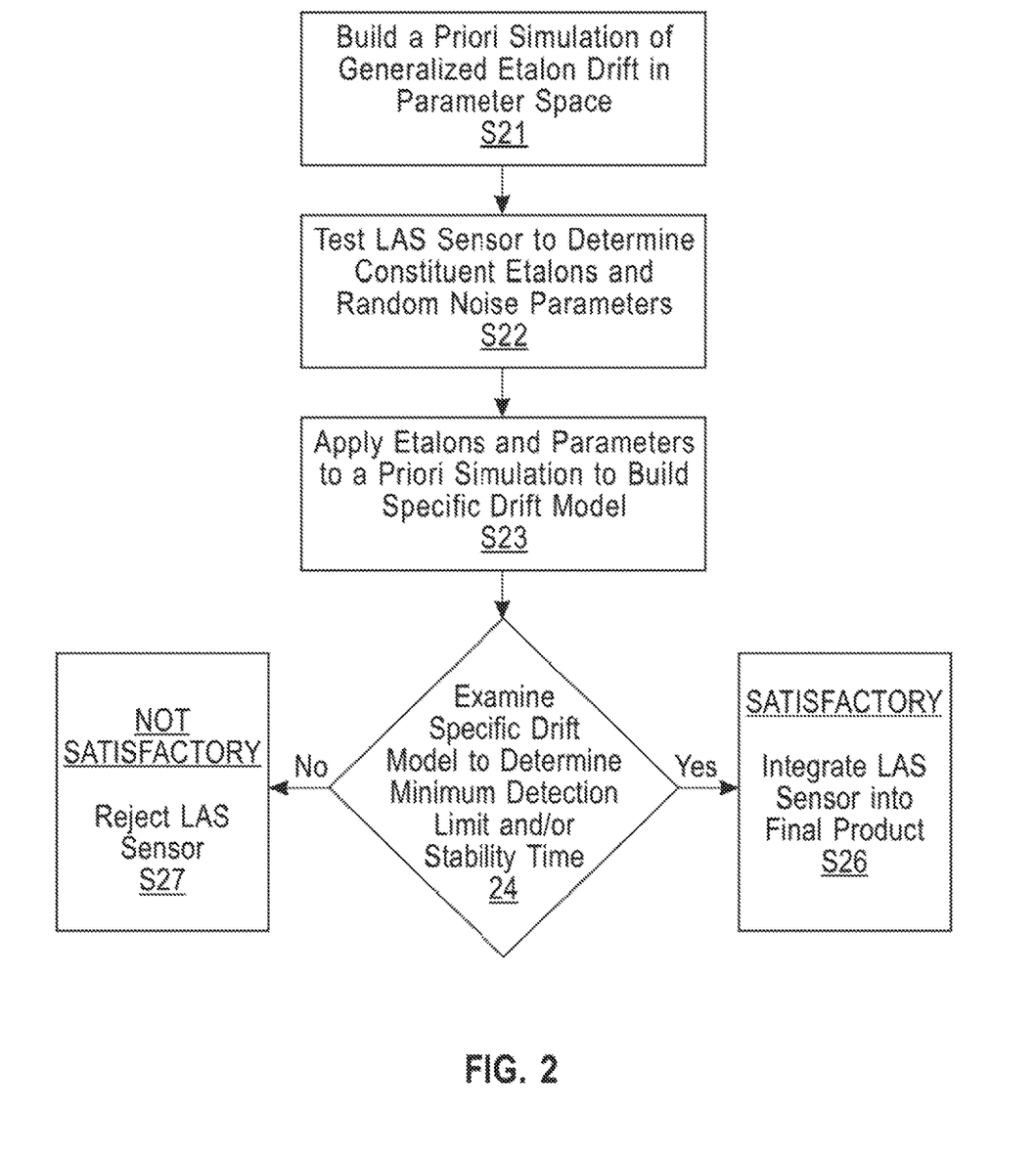
FIG. 2 is a flow chart illustrating an approach for assessing spectrographic sensor quality in accordance with exemplary embodiments of the present invention.

FIG. 2 is a flow chart illustrating an approach for assessing spectroscopic sensor quality in accordance with exemplary embodiments of the present invention. First, an a priori simulation of generalized etalon drift in parameter space is constructed (Step S21). This simulation may be constructed such that providing the simulation with the pertinent parameters is sufficient to model the etalon drift impact on the detection sensitivity and stability time of most if not all spectroscopic absorption sensors. Given the general applicability of the etalon simulation platform, the simulation may therefore be constructed a single time in an offline manner, which is to say, a single simulation may be constructed to test a plurality of spectroscopic absorption sensors and so the time and computational resources invested in constructing the simulation need not he repeated.

The aforementioned generalized simulation platform consists of simulating the impact of etalon drifts on the analyte concentration retrieval, where the analyte is specified by the end-user. During the simulation, the etalon amplitude and periodicity is varied, and each etalon is allowed to drift, across the analyte absorption resonance, resulting in an accuracy offset of the sensor over time. Based on the results of this one-time simulation, the normalized sensitivity impact may be calculated by scaling to normalization parameters (including, but not limited to temperature drift rate $T_R$ and short-term random-noise contributions $\sigma_0$). Such normalization allows generalization of the drift model to any $T_R$ and $\sigma_0$ that may be encountered in a field-deployment scenario. For example, the temperature drift $T_R$ may arise from the ambient diurnal temperature cycle over the course of a measurement day, while the random-noise contribution $\sigma_0$ may arise from the thermal noise of uncooled LAS components as the ambient temperature varies.

The normalization parameters $T_R$ and $\sigma_0$ described above encompass the minimum number of normalization parameters necessary to parametrize the generalized etalon drift model, which is performed across etalon periodicities and amplitudes. The temperature drift rate $T_R$ is provided as an expected upper bound of what may be expected in a realistic field deployment scenario, in order to determine the limit of detection and stability time of an absorption spectrometer in a worst-case drift scenario. The value $T_R$ may similarly be provided in the best-case drift scenario, or an intermediate drift scenario to determine the performance range of the sensor. The random-noise contribution $\sigma_0$ is determined by very short-term Allan-deviation analysis (<1 s) whereupon the random-noise contributions from laser intensity noise and/or detection system noise dominates the measurement and is not subject to fringe drifts at such short integration intervals. Alternatively, the short-term sensitivity o may also be ascertained directly simply based on knowledge of the laser intensity noise and/or detection system noise. In general, the spectroscopic sensor noise is limited by the random-noise contribution $\sigma_0$, and the ultimate performance of the sensor in the absence of etalon drifts will be limited by $\sigma_0/\sqrt{\tau}$, where $\tau$ denotes the averaging (i.e. "integration") time of the spectroscopic sensor. Intuitively, the two parameters $T_R$ and $\sigma_0$ respectively parametrize the accuracy and precision of a LAS sensor, and when given together, is sufficient to fully parametrize our generalized etalon drift model, his the, goal of our generalized etalon drift model to be able to quickly (i.e. numerically) provide a corresponding Allan-deviation curve based on $T_R$ and $\sigma_0$, without the need for long-term measurements required to empirically determine such curves under each environmental condition.

Given the two parameters $T_R$ and $\sigma_0$ which respectively parametrize the LAS sensor accuracy and precision, we may identify their individual contributions as two different slopes on the logarithmic scale of a standard Allan-deviation curve for LAS sensor sensitivity characterization. The latter case of random-noise (i.e. $\sigma_0$) contributes white-noise. Gaussian noise, or an otherwise uniform noise power spectral density, corresponding to $Hz^{-1/2}$ averaging (i.e. slope $m_0=-1/2$ on the Allan-deviation curve). On the other hand, etalon drifts follow $Hz^{+1}$ (i.e. slope $m_\xi=+1$). The two competing contributions (improvement of random noise with integration time, and deterioration of accuracy due to etalon drifts with integration time) may therefore be written as:

$$\log[\sigma_0(\tau)] m_0 \cdot \log[\tau] + c_0 \quad (EQ. 1)$$

$$\log[\sigma_\xi(\tau)] = m_\xi \cdot \log[\tau] c_\xi \quad (EQ. 2)$$

Where EQ. 1 and EQ. 2 correspond to random-noise and etalon contributions respectively, and $m_0=-1,2$ and $m_\xi=+1$ as described above. Note that all following considerations are for contributions from a single etalon of amplitude $\xi$ and physical path-length L. The constants $c_0$ and $c_\xi$ are the noise contributions at $\tau=1$ sec averaging times, and may be written as:

$$c_s = \log[\sigma_0(\tau=1)] \quad (EQ. 3)$$

$$c_\xi = \log[\sigma_\xi(\tau=1)] \quad (EQ. 4)$$

As described previously, our drift model treats $\sigma_0(\tau=1)$ as a model input from short-term Allan-deviation analysis of spectral acquisition from the LAS sensor device under test, and $\sigma_\xi(\tau=1)$ will be determined from our drift model. We note that to good approximation, the minimum detection limit (MDL) and stability time ($\tau_{stab}$) occurs at the intersection point where $\sigma_0(\tau_{stab})=\sigma_\xi(\tau_{stab})$, and therefore:

$$m_0 \cdot \log[\tau_{stab}] + c_0 = m_\xi \cdot \log[\tau_{stab}] + c_\xi \quad (EQ. 5)$$

From which it follows that:

$$(m_o - m_\xi) \cdot \log[\tau_{stab}] = c_\xi - c_o \quad (EQ. 6)$$

$$\log[\tau_{stab}] = -\frac{c_\xi - c_o}{m_\xi - m_o} \quad (EQ. 7)$$

Substituting EQ. 3 and EQ. 4 into EQ. 7, along with $m_\xi - m_0 = 3/2$, gives $$\log[\tau_{stab}] = \frac{2}{3} \cdot \log\left[\frac{\sigma_0(\tau=1)}{\sigma_\xi(\tau=1)}\right] \quad (EQ. 8)$$

Generally, the etalon-noise term $\sigma_\xi(\tau=1)$ is linearly dependent upon temperature drift rate ($T_R$) and etalon amplitude ($\xi$), while being nonlinearly dependent upon the etalon length (L). The latter nonlinear dependence may be described by an envelope function $\rho(L)$, and thus we may write (including any constants of proportionality in $\rho(L)$):

$$\sigma_\xi(\tau=1)=T_R \cdot \xi \cdot \rho(L) \quad (EQ. 9)$$

Which upon substitution into EQ. 8, yields:

$$\log[\tau_{stab}] = \frac{2}{3} \cdot \log\left[\frac{\sigma_0(\tau=1)}{T_R \cdot \xi \cdot \rho(L)}\right] \quad (EQ. 10)$$

From which we determine a normalized stability time $\tau_{stab}/\zeta_\tau$, given by:

$$\frac{\tau_{stab}}{\zeta_r} = [\xi \cdot \rho(L)]^{-2/3}, \zeta_r = \sigma_0(\tau=1)^{2/3} \cdot T_R^{-2/3} \quad (EQ. 11)$$

Note that the quantity on the left-hand side is dependent only upon the etalon physical parameters (amplitude and length, as given on the right-hand side of EQ. 11), from which we may derive a generalized (normalized) stability time. The remaining parameters $\sigma_0$ and $T_R$ in the denominator $\zeta_\tau$ serve as empirical inputs to the drift model, based on measured short-term sensitivity and expected drift tolerance respectively. To calculate the MDL, we substitute EQ. 11 back into EQ. 1, and noting that $MDL=\sigma_0(\tau=\tau_{stab})$, we obtain the normalized MDL:

$$\frac{MDL}{\zeta_\sigma} = [\xi \cdot \rho(L)]^{1/3}, \zeta_\sigma = \sigma_0(\tau=1)^{2/3} \cdot T_R^{1/3} \quad (EQ. 12)$$

Figure 5:
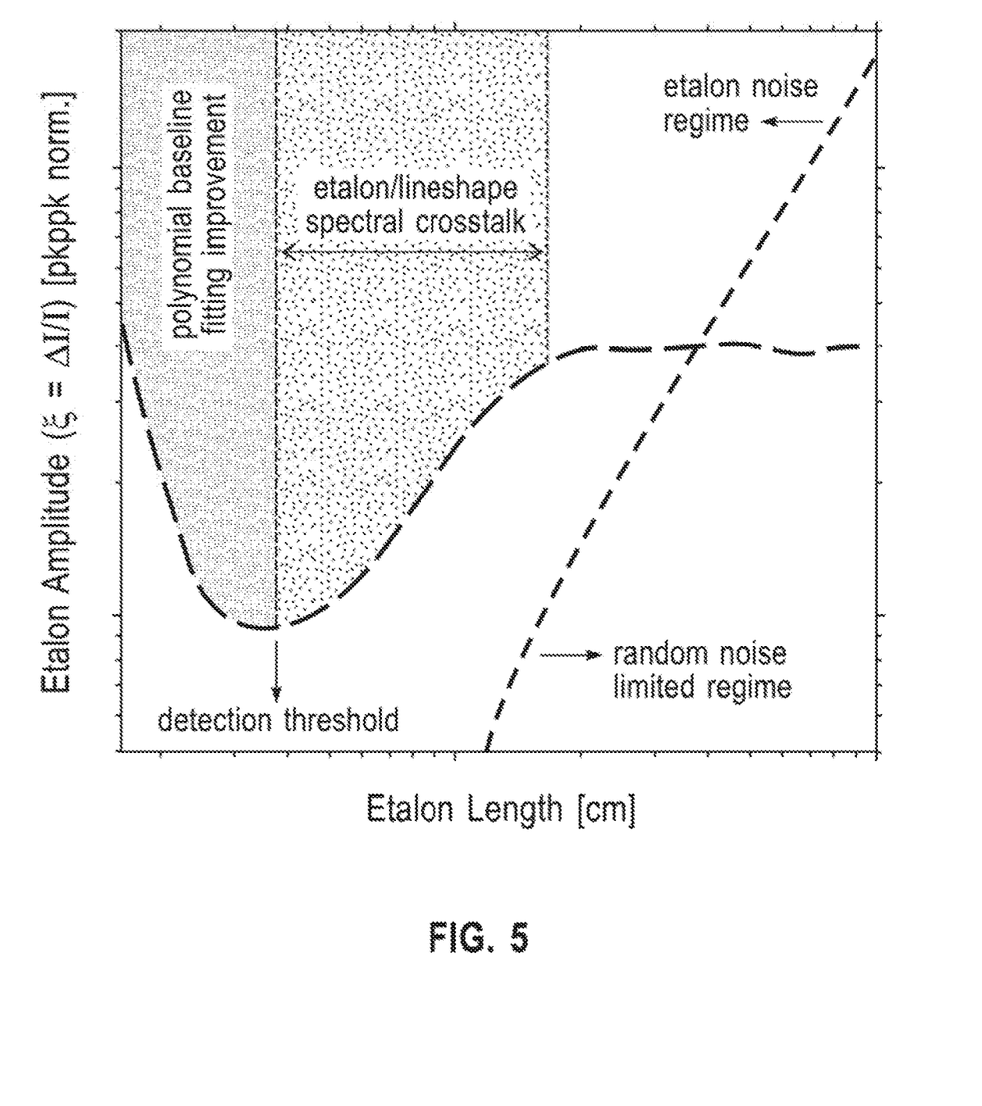
FIG. 5 is a graph illustrating a relationship between sensor stability/sensitivity and etalon amplitude and frequency (i.e. inverse physical path length) in accordance with exemplary embodiments of the present invention.

EQ. 11 and 12 form the basis of our LAS sensor drift model, whereby we may calculate generalized $\tau_{stab}$ and MDL results based on the numerical determination of $\xi\rho(L)$ for varying etalon amplitudes ($\xi$) and lengths (L). The result of EQ. 12 is shown in FIG. 5, which depicts the contour plot of normalized MDL over the physical etalon parameter space, where the contours depict regions of noise dominance in relation to the desired detection threshold. It is in this sense that our generalized drift model arises; the results of our simulation platform yield the results of a full Allan-deviation sensitivity analysis using inputs pertaining only to hardware properties (etalon path-length L and amplitude $\xi$).

Through a simple application of scaling factors $\zeta_\tau$ and $\zeta_\sigma$ determined in EQ. 11 and 12, we may translate the normalized values obtained from our contour map in FIG. 5 to actual sensitivity values for any specific LAS sensor with known etalon features (i.e. amplitude and physical length L), which may be determined through a simple spectral acquisition to extract the individual etalon contributions.

Upon conclusion of the construction of a generalized etalon drift model, various spectroscopic absorption sensors may be fabricated or otherwise procured, and each sensor may undergo one or more tests to determine values for the normalization parameters and constituent etalons present in the spectral baseline (Step S22). The constituent etalons may be determined by a single spectral acquisition, followed by a spectral decomposition (e.g. including but not limited to Fourier decomposition, Airy decomposition, or any other decomposition procedure that extracts each individual etalon $\xi$ and L contribution). These parameters and constituent etalons, as described above, may represent physical characteristics of the environment (e.g. $T_R$) and/or particular spectroscopic sensor (e.g. $\sigma_0$ and etalon amplitude/periodicities) being tested. The determined parameter values may thereafter be applied to the a priori simulation of the generalized etalon drift to generate a full sensitivity model for the drift of the particular spectroscopic sensor being tested (Step S23). The generated drift model specific to the sensor (i.e. using the etalons and $\sigma_0$ specific to the sensor, and anticipated $T_R$ drift rate imposed by the ambient) may then be examined to determine whether the gas accuracy of the sensor (i.e. minimum detection limit and stability time) is within tolerable limits for the target application specified by the end-user (Step S24). Based on the results of the specific drift model applied to a specific sensor unit, the decision as to the utility of the spectroscopic sensor may be determined based on the minimum detection limits and/or stability times provided by the sensor-specific model. Given that the minimum detection limits and/or stability time results that lie below a tolerable limit (Yes, Step S24), the spectroscopic sensor has passed the diagnostic performance test and is deemed satisfactory, and may be put to use, for example, by being integrated into an LAS sensor (Step S26). However, if the modeled drift is determined to be above the tolerable limits set by end-user and target application, the sensor is deemed to be not satisfactory (No, Step S24), then the spectroscopic sensor may be rejected. A rejected spectroscopic sensor may either be discarded, remediated and tested again, or put to a use in an application where the accuracy and/or stability time constraints are relaxed or less stringent.

In summary, the a priori simulation (Step S21) may return a normalized measure of sensor sensitivity (i.e. minimum detection limit) and stability time as indicated by EQ. 11 and EQ. 12, and these values are parametrized via parameters including by not limited to temperature drift rate ($T_R$) and random-noise contributions from the laser intensity noise and detection system noise ($\sigma_0$), where other parameters may be introduced in a normalized manner such that the generality of the a priori etalon drift model may be maintained. The result of applying the relevant parameters to the generalized etalon drift model may be used to create a sensor specific drift model to determine if the sensor satisfied the constraints of the target application (i.e. minimum detection limit and/or stability time), and whether the sensor is rejected or used for the target application.

Two key aspects of the above-described approaches are how the generalized model is generated and how the generalized model is used to determine sensor sensitivity and stability.

Figure 3:
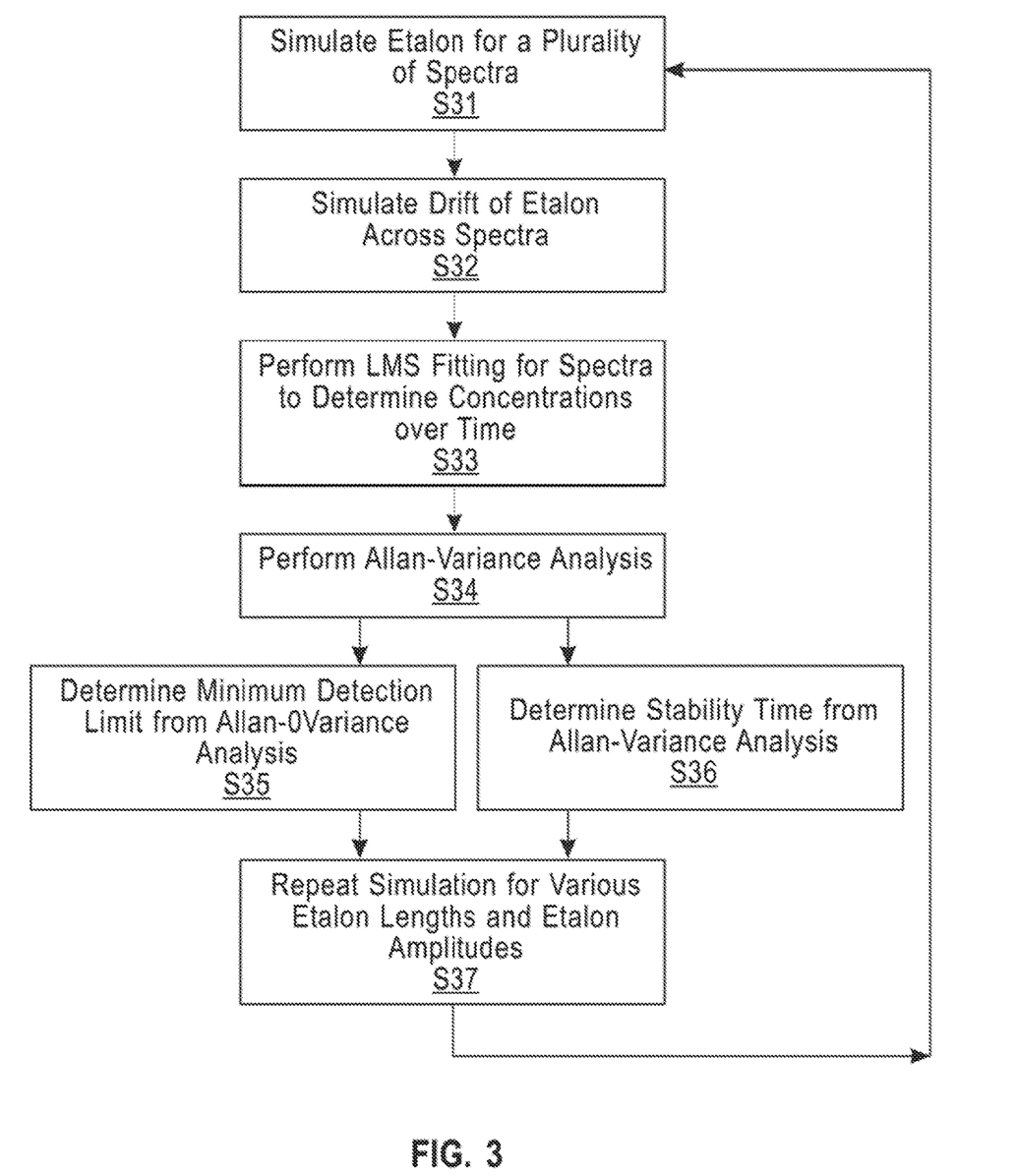
FIG. 3 is a flow chart illustrating an approach for constructing a generalized etalon drift model in accordance with exemplary embodiments of the present invention.

FIG. 3 is a flow chart illustrating an approach for constructing an a priori generalized etalon drift model in accordance with exemplary embodiments of the present invention. First, a plurality of etalons may be simulated using varying etalon periodicities (free-spectral ranges) and amplitudes (Step S31). The simulations are independent of the mechanism through which the fringes are generated, and the spectroscopic sensor platform that is used (e.g. reflections between partially reflecting surface in free-space, or random scattering defects due to line-edge roughness on a silicon waveguide, etc.). A sequence of such etalon spectra may be simulated under defined thermal drift conditions ($T_R$) and random-noise contributions ($\sigma_0$), that is, in the same way that drifting of the etalons may occur over time and temperature, at this step, the simulation is allowed to drift as a real etalon may be disposed to drift over time and temperature (Step S32). The corresponding spectral fitting may be performed using relevant atomic/molecular transition lineshape parameters, yielding a Voigt LMS (VLMS) fit to the simulated spectra (Step S33). In alternate embodiments of the present invention, the LMS regression models may incorporate lineshapes including, but not limited to Lorentz, Gaussian, Rautian, Galatry models. In this manner, a simulated retrieved concentration time-series for a target analyte may be generated under simulated temperature drift conditions $T_R$ and random-noise contributions $\sigma_0$, where each of the retrieved concentration points is a result of spectra that may be allowed to drift from one temperature to the next. Allan-deviation analysis may then be performed on the retrieved analyte concentration time-series (Step S34). From the Allan-deviation result, a sensor minimum detection limit MDL and stability time $\tau_{stab}$ may be determined (Steps S35 and S36) for given model parameters $T_R$ and random-noise contributions $\sigma_0$. The generalized etalon drift model is created by simulating the MDL and $\tau_{stab}$ results across a range of etalon amplitudes and periodiritics (Step S37), where the former corresponds to etalon cavity quality factor, and the latter corresponds to the physical path length of the etalon. Upon completion of the simulation across various etalon configurations, the resulting MDL (Step S35) and $\tau_{stab}$ (Step S36) as determined from the Allan-deviation curves are normalized to sensor and environmental parameters $\sigma_0$ and $T_R$, yielding a generalized MDL and $\tau_{stab}$ that may be determined for any specific sensor, given the anticipated thermal drift rate and random noise contributions. The above description of the generalized etalon drift model is essentially a forward simulation model whereby the impact of etalon drift is directly modeled to determine its impact on the resulting concentration, with the intention of using the measured etalons in a real-world case to determine the corresponding sensitivity that is achievable by a spectroscopic LAS sensor.

Figure 4:
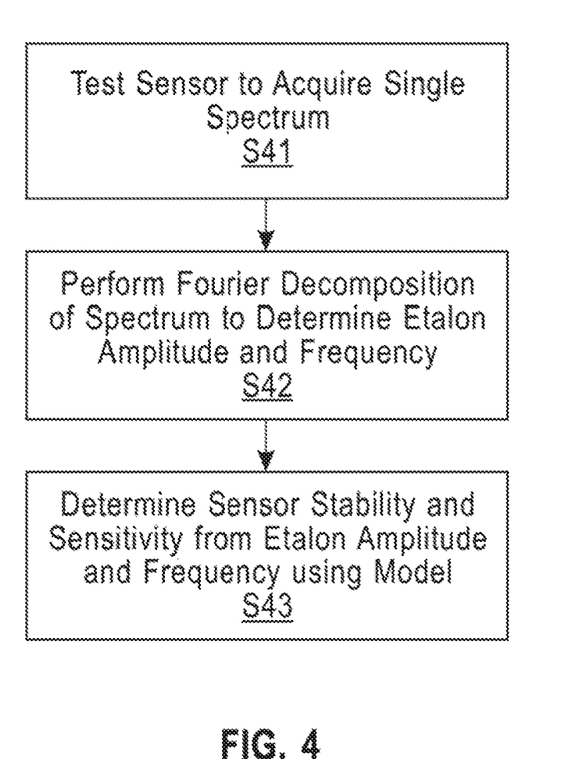
FIG. 4 is a flow chart illustrating an approach for using the generalized etalon drift model to determine sensitivity and stability of a specific spectroscopic sensor in accordance with exemplary embodiments of the present invention.

FIG. 4 is a flow chart illustrating an approach for using the generalized etalon drift model to determine sensitivity and stability of a spectroscopic LAS sensor in accordance with exemplary embodiments of the present invention. First, a spectroscopic sensor may be tested in use to acquire a single spectrum (Step S41). Then, Fourier decomposition may be performed on the acquired spectrum to determine etalon amplitude and frequency (Step S42). In alternate embodiments of the present invention, an Airy decomposition, or any other decomposition method to extract each individual etalon contribution may be utilized with no loss of generality of the method described herein. From there, the etalon amplitude and frequency may be used as in the forward simulation model depicted in FIG. 3 for the generalized etalon drift model and the sensor stability and MDL may be determined therefrom (Step S43) using the appropriate thermal drift rate ($T_R$) and random noise ($\sigma_0$) parameters for a specific sensor and drift scenario.

As mentioned above, sensor stability and sensitivity may be inferred from etalon amplitude and frequency. FIG. 5 is a graph illustrating a relationship between sensor stability/sensitivity and etalon amplitude/frequency in accordance with exemplary embodiments of the present invention.

As can be seen from this figure, short etalon lengths (e.g. wavelengths) may be indicative of a polynomial baseline that can accommodate broad spectral features. Intermediate etalon lengths may be indicative of significant cross-talk with line-shape, which may indicate that etalon constraints are more stringent. Long etalon lengths may lead to etalon contributions to be embedded with random noise. Here, the etalon parameter constraint is a determination of whether the amplitude resides below detection threshold and within random-noise limited regime. Thus, by considering etalon length for the given etalon amplitude, it may be determined whether the sensor is sensitive and stable enough for use in a specific deployment scenario.

Figure 6:
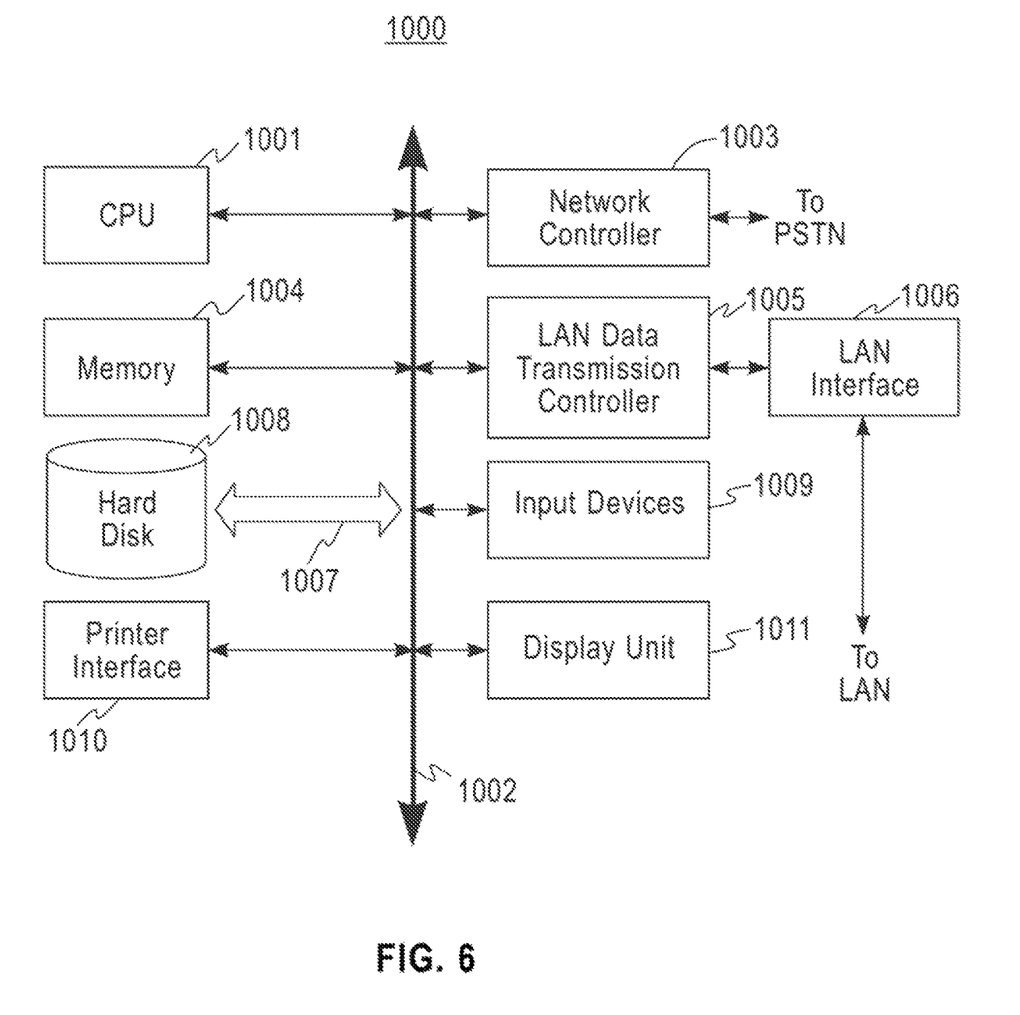
FIG. 6 shows an example of a computer system capable of implementing the method and apparatus according to embodiments of the present disclosure.

FIG. 6 shows another example of a system in accordance with some embodiments of the present invention. By way of overview, some embodiments of the present invention may be implemented in the form of a software application running on one or more (e.g., a "cloud" of) computer system(s), for example, mainframe(s), personal computer(s) (PC), handheld computer(s), client(s), server(s), peer-devices, etc. The software application may be implemented as computer readable/executable instructions stored on a computer readable storage media (discussed in more detail below) that is locally accessible by the computer system and/or remotely accessible via a hard wired or wireless connection to a network, for example, a local area network, or the Internet.

Referring now to FIG. 6, a computer system (referred to generally as system 1000) may include, for example, a processor e.g., central processing unit (CPU) 1001, memory 1004 such as a random access memory (RAM), a printer interface 1010, a display unit 1011, a local area network (LAN) data transmission controller 1005, which is operably coupled to a LAN interface 1006 which can be further coupled to a LAN, a network controller 1003 that may provide for communication with a Public Switched Telephone Network (PSTN), one or more input devices 1009, for example, a keyboard, mouse etc, and a bus 1002 for operably connecting various subsystems components. As shown, the system 1000 may also he connected via a link 1007 to a non-volatile data store, for example, hard disk, 1008.

In some embodiments, a software application is stored in memory 1004 that when executed by CPU 1001, causes the system to perform a computer-implemented method in accordance with some embodiments of the present invention, e.g., one or more features of the methods, described with reference to FIGS. 2, 3, and 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read.-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), in some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to he performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary embodiments described herein are illustrative, and many variations can be introduced without departing from the spirit of the invention or from the scope of the appended claims. For example, elements and/or features of different exemplary embodiments may be combined with each other and/or substituted for each other within the scope of this invention and appended claims.

What is claimed is:

1. A method for assessing spectroscopic sensor accuracy, comprising:
building an a priori simulation of generalized etalon drift;
testing a spectroscopic sensor to determine use parameters;
generating a specific drift model by applying the determined use parameters to the built a priori simulation of generalized etalon drift; and
analyzing the specific drift model to determine whether the spectroscopic sensor is satisfactory.

2. The method of claim 1, wherein the a priori simulation of generalized etalon drift is represented in a parameter space of the use parameters.

3. The method of claim 1, wherein the use parameters include constituent etalons, random noise parameters, and/or temperature drift rate.

4. The method of claim 1, wherein analyzing the specific drift model includes determining a minimum detection limit and/or sensor stability time.

5. The method of claim 1, wherein when it is determined that the spectroscopic sensor is not satisfactory, the spectroscopic sensor is disposed of or remediated.

6. The method of claim 1, wherein when it is determined that the spectroscopic sensor is satisfactory, the spectroscopic sensor is incorporated into a final product.

7. The method of claim 1, wherein building the a priori simulation of generalized etalon drift, comprises:
simulating etalon for a plurality of spectra;
simulating drift of the etalon; performing least mean square (LMS) fitting for the spectra to determine concentrations over time;
perform Allan-deviation analysis on the LMS fitting;
determine minimum detection limit from the Allan-deviation analysis; and
determine stability time from the Allan-deviation analysis.

8. The method of claim 7, wherein building the a priori simulation is repeated for various etalon lengths and etalon amplitudes.

9. A computer program product for assessing spectroscopic, sensor accuracy, the computer program product comprising a computer readable storage medium having program instructions embodied therewith, the program instructions executable by a computer to cause the computer to:
build, by the computer, an a priori simulation of generalized etalon drift;
test a spectroscopic sensor, by the computer, to determine use parameters;
generate a specific drift model, by the computer, by applying the determined use parameters to the built a priori simulation of generalized etalon drift; and
analyze the specific drift model, by the computer, to determine whether the spectroscopic sensor is satisfactory.

10. The computer program product of claim 9, wherein the a priori simulation of generalized etalon drift is represented in a parameter space of the use parameters.

11. The computer program product of claim 9, wherein the parameters include constituent etalons, random noise parameters, and/or temperature drift rate.

12. The computer program product of claim 9, wherein analyzing the specific drift model includes determining a minimum detection limit and/or sensor stability time.

13. The computer program product of claim 9, wherein when it is determined that the spectroscopic sensor is not satisfactory, disposal of or remediation of the spectroscopic sensor is indicated.

14. The computer program product of claim 9, wherein when it is determined that the spectroscopic sensor is satisfactory, incorporation of the spectroscopic sensor into a final product is indicated.

15. The computer program product of claim 9, wherein building the a priori simulation of generalized etalon drift, comprises:
   simulating etalon for a plurality of spectra;
   simulating drift for the etalon; performing least mean square (LMS) fitting for the spectra to determine concentrations over time;
   perform Allan-deviation analysis on the LMS fitting;
   determine minimum detection limit from the Allan-deviation analysis; and
   determine stability time from the Allan-deviation analysis.

16. The computer program product of claim 9, wherein building the a priori simulation is repeated for various etalon lengths and etalon amplitudes.

17. A system for assessing spectroscopic sensor accuracy, comprising:
   a simulator configured to build an a priori simulation of generalized etalon
   a spectroscopic sensor configured to run a test to determine use parameters;
   a modeler configured to generate a specific drift model by applying the determined use parameters to the built a priori simulation of generalized etalon drift; and
   an analyzer configured to analyze the specific drift model to determine whether the spectroscopic sensor is satisfactory.

18. The system of claim 17, wherein the simulator is further configured to represent the a priori simulation of generalized etalon drift in a parameter space of the use parameters.

19. The system of claim 17, wherein the analyzer is further configured to determine a minimum detection and/or sensor stability time in analyzing the specific drift model.

20. The system of claim 17, wherein the simulator is configure to build the a priority simulation of generalized etalon drift, by:
   simulating etalon for a plurality of spectra; simulating drift for the etalon;
   performing least mean square (LMS) fitting for the spectra to determine concentrations over time;
   perform Allan-deviation analysis on the LMS fitting;
   determine minimum detection limit from the Allan-deviation analysis and
   determine stability time from the Allan-deviation analysis.

* * * * *